United States Patent [19]

De Jong

[11] Patent Number: 5,115,398
[45] Date of Patent: May 19, 1992

[54] METHOD OF DISPLAYING NAVIGATION DATA FOR A VEHICLE IN AN IMAGE OF THE VEHICLE ENVIRONMENT, A NAVIGATION SYSTEM FOR PERFORMING THE METHOD, AND A VEHICLE COMPRISING A NAVIGATION SYSTEM

[75] Inventor: Durk J. De Jong, Eindhoven, Netherlands

[73] Assignee: U.S. Philips Corp., New York, N.Y.

[21] Appl. No.: 737,815

[22] Filed: Jul. 29, 1991

Related U.S. Application Data

[63] Continuation of Ser. No. 545,318, Jun. 27, 1990, abandoned.

[30] Foreign Application Priority Data

Jul. 4, 1989 [NL] Netherlands ............... 8901695

[51] Int. Cl.⁵ .................................... G06F 15/50
[52] U.S. Cl. ................................ 364/443; 364/449; 358/103; 340/995
[58] Field of Search ............. 364/443, 444, 449; 73/178 R; 358/103; 340/988, 990, 995

[56] References Cited

U.S. PATENT DOCUMENTS

| | | | |
|---|---|---|---|
| 4,716,458 | 12/1987 | Heitzman et al. | 358/103 |
| 4,814,896 | 3/1989 | Heitzman et al. | 358/103 |
| 4,819,169 | 4/1989 | Saitoh et al. | 358/103 |
| 4,855,822 | 8/1989 | Narendra et al. | 358/103 |
| 4,937,570 | 6/1990 | Matsukawa et al. | 340/988 |

Primary Examiner—Gary Chin
Attorney, Agent, or Firm—Jack D. Slobod

[57] ABSTRACT

A method of and system for displaying navigation data for a vehicle in conjunction with an image of the vehicle environment, in which from navigation data of a vehicle, derived from a navigation system, there is formed an indication signal which is superposed on an image of the local environment generated by an image pick-up unit. The combination of indication signal and local environmental image is displayed on a display unit.

9 Claims, 2 Drawing Sheets

METHOD OF DISPLAYING NAVIGATION DATA FOR A VEHICLE IN AN IMAGE OF THE VEHICLE ENVIRONMENT, A NAVIGATION SYSTEM FOR PERFORMING THE METHOD, AND A VEHICLE COMPRISING A NAVIGATION SYSTEM

This is a continuation of application Ser. No. 07/545,318, filed Jun. 27, 1990 now abandoned.

BACKGROUND OF THE INVENTION

The invention relates to a method of displaying navigation data for a vehicle in an image of the local vehicle environment.

The invention also relates to a navigation system suitable for performing such a method, and to a vehicle comprising such a navigation system.

A method of this kind is known from the article "New frontiers for Detroit's Big Three", Ronald K. Jurgen, IEEE Spectrum, October 1988, p. 32. The cited article describes a method where navigation data for a vehicle, for example a digital speed reading, low-fuel warning, etc. is projected onto the windshield and thus combined with the view of the driver of the car. Information from a number of sensors is processed by an electronic module so as to form signals which are applied to a vacuum-fluorescent tube, after which optical elements project the light from activated segments of the tube onto the windshield of the vehicle. The driver sees virtual images which appear to float in the vicinity of the front of the car. It is a drawback of such a method that its possibilities are limited. The navigation data can be displayed in a small area only, because display in an area covering the field of view of the driver, for example an area having the dimensions of a windshield of a car, is difficult to realise and expensive. Coverage of the entire windshield requires notably a large angle of aperture of the optical system and is hence problematic and expensive.

SUMMARY OF THE INVENTION

It is inter alia an object of the invention to provide a method of displaying navigation data for a vehicle in an image of the local vehicle environment which allows for a simple, user-friendly and readily interpretable display of the navigation data. To achieve this, a method in accordance with the invention is characterized in that an image of the local environment is generated by an image pickup unit, which image is displayed on a display unit, an indication signal formed from the navigation data being superposed on the image. The image pick-up unit picks up the most relevant environment as chosen by the driver, for example the road ahead of the vehicle, thus producing a very realistic image of the environment on a display unit. It has been found that such an image is more user-friendly than an abstract representation, for example in the form of pictograms. Because of the superposition of an indication signal formed from the navigation data, this signal overlaps the image on the display unit. The navigation data indicates, for example the speed or the remaining fuel reserve, but may also consist of one or more indication such as arrows indicating a direction to be followed.

One version of a method in accordance with the invention where the navigation data is generated by a navigation system on the basis of measurement data from sensors and/or topographic data from a data structure, is characterized in that before formation of the indication signal, the navigation data is transformed in conformity with a position of the image pick-up unit with respect to the environment. The navigation data can thus be combined with the image so that the user is optimally informed at a single glance. For example, when approaching an intersection the direction to be followed, calculated by the car navigation system, can be indicated by an arrow overlaid on the road section to be followed on the display unit. The traffic situation can thus be particularly quickly and easily interpreted.

A further version of a method in accordance with the invention is characterized in that the navigation data is transformed by way of a perspective transformation. By superposing the navigation data in perspective on the image, a readily interpretable user-friendly display which corresponds to reality is obtained. The fact that a road section to be taken is obscured by buildings and the like can then be taken into account, provided that such data is included in the data structure.

A further version of a method in accordance with the invention is characterized in that the display unit displays the navigation data so as to be distinct. This enhances the clarity of the display.

A preferred version of a method in accordance with the invention, where the navigation data is generated by a navigation system on the basis of measurement data from sensors and topographic data from a data structure in which roads are represented by coordinates of their centre lines, is characterized in that prior to the formation of the indication signal from the navigation data, the representation of the roads is converted into a representation by polygons. Using this polygon representation, the indication signal can be adapted better to the image of the environment; the true width of the roads then becomes apparent. For example, arrows indicating the direction to be followed can be displayed in the centre of the lane to be followed.

A navigation system which is suitable for performing a method in accordance with the invention is characterized in accordance with the invention in that the navigation system comprises an image pickup unit which generates an image of the local environment, a transformation module for transforming navigation data generated by the navigation system, a video generator for generating an indication signal from the transformed navigation data, a combination module for combining the image of the environment and the indication signal so as to form a combined signal, and a display unit for displaying the combined signal.

DESCRIPTION OF THE PREFERRED EMBODIMENTS

Figure 1:
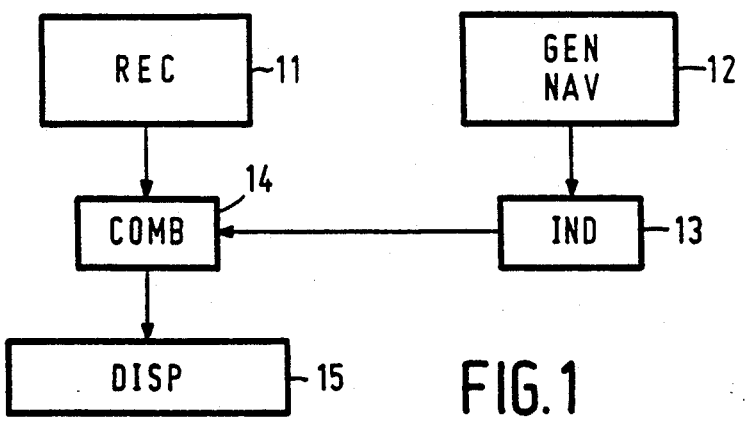
FIG. 1 shows a flowchart of a method in accordance with the invention.

FIG. 1 shows a flowchart of a method in accordance with the invention. In block 11 an image of the environment is generated by means or an image pick-up unit, for example a video camera aboard a vehicle. In block 12, known from the article "CARIN, a car information and navigation system" by M. L. G. Thoone, Philips Technical Review, Vol. 43, No. 11/12, pp. 317-329, December 1987, the navigation data to be displayed therein are generated; in block 13 an indication signal is formed therefrom, for example by means of a known video generator, which indication signal is superposed in block 14, for example by means of a video combination module, on the environment image. In block 15 the combination is displayed on a display unit, for example a video display, a television receiver or a monitor, aboard the vehicle.

Figure 2:
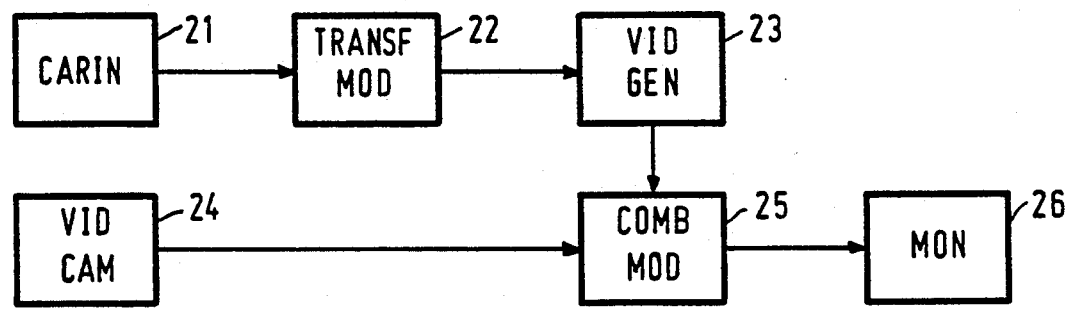
FIG. 2 diagrammatically shows the structure of a navigation system suitable for performing the method in accordance with the invention.

FIG. 2 diagrammatically shows the structure of a navigation system suitable for performing the method in accordance with the invention. Module 21 is a known car navigation system, for example a CARIN system as described in the cited article by N. L. G. Thoone, which supplies navigation data on the basis of measurement data from sensors (such as a compass and wheel sensors which measure the number of revolutions) and topographic data in a data structure, for example coordinates which represent the current position of the vehicle and coordinates which represent a calculated optimum route to be followed. In module 22 this navigation data is subjected to a transformation in accordance with the position of the image pick-up unit 24 with respect to the environment: the relevant area of the data structure containing the topographic data is "viewed" from the point of view of the image pick-up unit as described in the previously filed, non-prepublished Netherlands Patent Application No. 8900056 (corresponding to U.S. patent application Ser. No. 463,696 filed Jan. 11, 1990). Navigation data to be displayed, for example indications of the route to be followed, thus correspond to the roads in the local image of the environment. Module 23 is a video generator which forms an indication signal from the transformed navigation data: for example, a stylistic indication of the route to be followed. Image pick-up unit 24 (a video camera or television camera) supplies an image of the environment. In a combination module 25 the indication signal and the environment image are combined so as to form a combined signal which is displayed on display unit 26 (a video display, television receiver or monitor).

Figure 3:
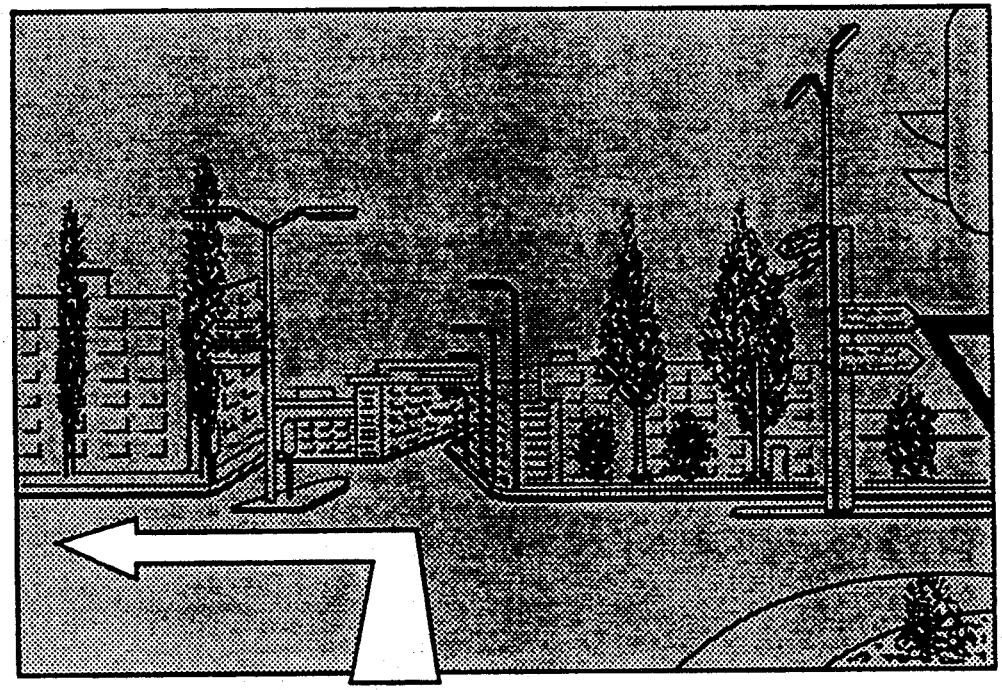
FIG. 3 shows examples of a local image for display on a display unit in combination with navigation data.

FIG. 3 shows an example of a display of an image of the environment in combination with stylized navigation data. The arrow indicates the direction to be followed as calculated by the navigation system: in this case indication to turn left, which indication is overlaid on the road section to be followed. When the navigation data is displayed in a distinct manner, for example in a flashing or boxed manner, or in a bright colour which is distinct from the remainder of the image, the user will see how to act at one glance.

In the CARIN data base roads are represented by the coordinates of their centre lines. For a realistic display on a display unit, it is important to convert this representation into a representation by way of polygons which is compatible with the realistic image of the environment. To this end, the structure in the CARIN data base is converted into a new structure whose most important categories are:

nodes (P), each of which is represented by two coordinates (or three coordinates if the data base also contains information as regards altitude);

roads (R), each of which is represented by the number and location of the constituent nodes;

links (L), each of which is represented by the associated road and its direction;

intersections (I), each of which is represented by the number and the location of the constituent links.

Figure 4:
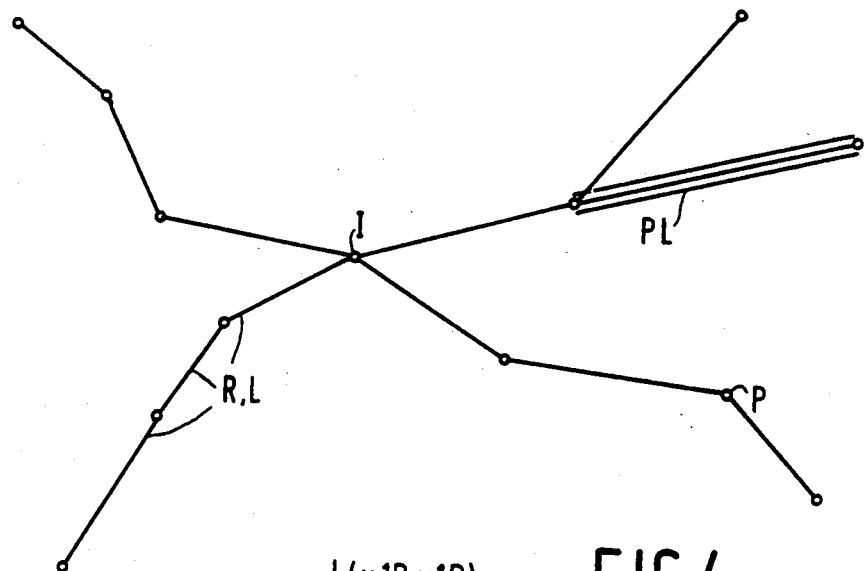
FIG. 4 illustrates the data structure used.
Figure 5:
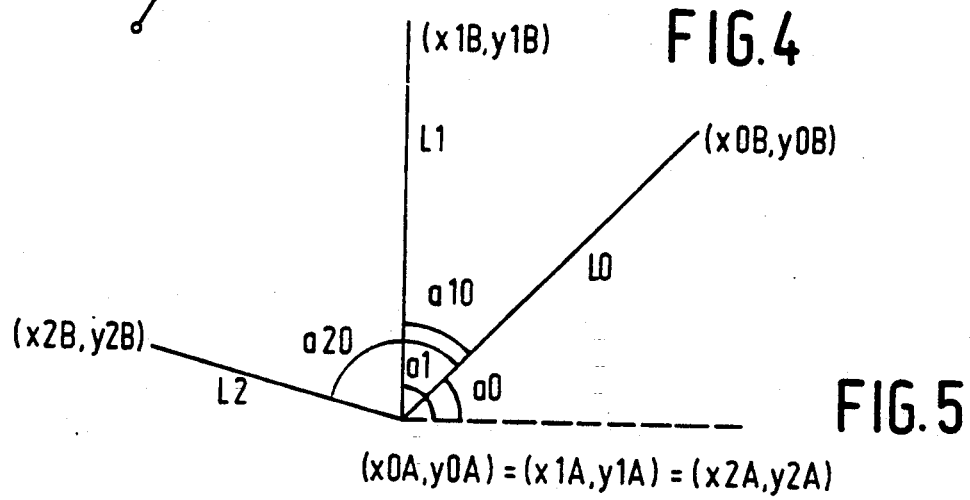
FIG. 5 illustrates the sorting of the connections.

The category of links is extended to p-links (PL) by including also the left-hand and the right-hand side of the road; the list of roads and nodes is thus increased (the left-hand and the right-hand side of the road also constitute a separate road defined by nodes), but the structure remains the same, see FIG. 4. Subsequently, for each intersection the links leading thereto are sorted in a counterclock-wise fashion to form a list of links. This is realised as follows: the first link L0 referred to acts as a reference. If the angle between this link L0 and the next link L1 is greater than the angle between L0 and the subsequent link L2, L1 and L2 are interchanged in the list of links, see FIG. 5.

The cosine and the sine of the angle a0 enclosed by the link L0 with respect to the positive X-axis are:

$$\cos(a0) = (x0B - x0A)/SQRT((x0B - x0A)^2 + (y0B - y0A)^2);$$

$$\sin(a0) = (y0B - y0a)/SQRT((x0B - x0A)^2 + (y0B - y0A)^2);$$

and the same is applicable to the links L1 and L2.

It follows therefrom that:

$$\cos(a10) = \cos(a1 - a0) = \cos(a1)*\cos(a0) + \sin(a1)*\sin(a0);$$

$$\sin(a10) = \sin(a1 - a0) = \sin(a1)*\cos(a0) - \cos(a1)*\sin(a0);$$

and the same is applicable to cos (a20) and sin (a20).

The sequence is then determined as follows:

```
if sin(a10) > 0
subsequently if sin(a20) > 0
         subsequently if cos(a10) > cos(a20)
         do not interchange.
         and otherwise interchange
         otherwise do not interchange
otherwise if sin(a20) > 0
         interchange
         otherwise if cos(a10) < cos(a20)
                  do not interchange
                  otherwise interchange.
```

Figure 6:
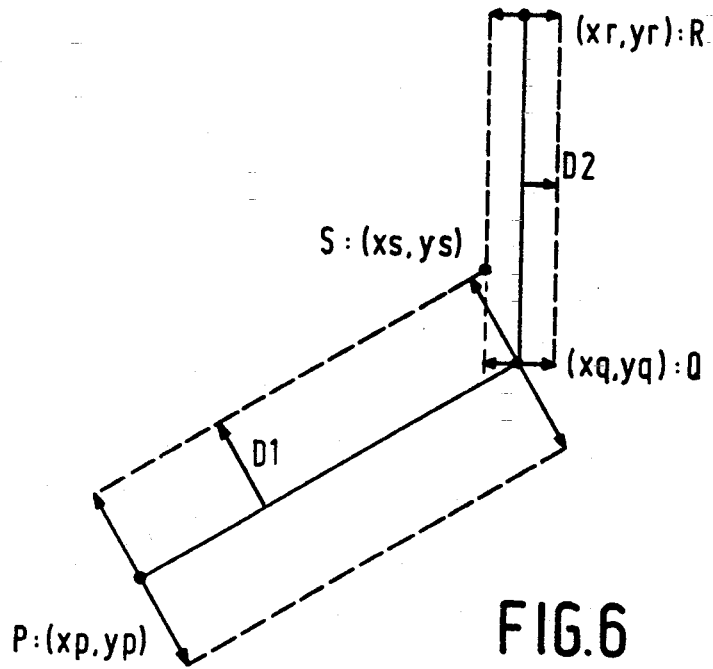
FIG. 6 illustrates the conversion into polygons.

Subsequently, for each intersection the centre line of all links departing from the respective intersection is converted into a polygon, see FIG. 6.

For all points, except for the terminal points, the point of intersection of adjoining left-hand and right-hand road sides is calculated. The vector having the length D1, perpendicular to PQ, is given by:

$$(xpq, ypq),$$

where $xpq = -(yq - yp)*gpq$ and $$ypq = (xq - xp)*gpq.$$

where $gpq = D1/SQRT((xq - xp)^2 + (yq - yp)^2)$.

To the vector perpencidular to QR, having the length D2, an analogous expression is applicable:

$$(xqr, yqr),$$

where $xqr = -(yr - yq*gqr$ and $$yqr = (xr-xq)*gqr$$

where $gqr = D2/SQRT((xr-xq)^2 + (yr-yq)^2)$.

The point of intersection (xs,ys) searched is the point of intersection of the line between (xp+xpq, yp+ypq) and (xq+xpq, yq+ypq) and the line between (xq+xqr, yq+yqr) and (xr+xqr, yr+yqr). The following is applicable:

$$xs = xpq + n*xp + (1-n)*xq \quad \text{and} \quad ys = ypq + n*yp + (1-n)*yq;$$
$$xs = xqr + m*xq + (1-m)*xr \quad \text{and} \quad ys = yqr + m*yq + (1-m)*yr;$$

solution of these equations for the parameter n results in:

$$n = [(yq-yr)*(xpq+xq-xqr-xr) - (xq-xr)*(ypq+yq-yqr-yr)] / \ldots$$
$$/ [(xq-xr)*(yp-yq) - (yq-yr)*(xp-xq)]$$

If the denominator is zero, the two line segments are situated one in the prolongation of the other and the parameter n is assumed to equal zero.

The point of intersection (xs,ys) has thus been found. Each centre line has thus been supplemented so as to form a real street having a given width.

Finally, all polygons thus found are coupled to the associated intersections. Because the links have been sorted while proceeding counterclock-wise, each time the point of intersection of the left-hand edge of a link with the right-hand edge of the next link is calculated. The calculations are fully analogous to the foregoing.

The network of roads consisting of "dashed roads" has thus been converted into a network of "real" roads. The navigation data can now be positioned so as to correspond better to the image of the environment.

I claim:

1. A method of displaying navigation data for travel of a sterrable vehicle through a network of intersecting roads, comprising generating a generally forward looking image of a local vehicle environment by an image pick-up unit, displaying said image on a display unit, and superimposing on said displayed image, at a position in said displayed image proximate an upcoming intersection between a road of current travel and an intersecting road, an indication signal formed from the navigation data indicating a direction of travel to be taken at said intersection of roads.

2. A method as claimed in claim 1 further comprising generating the navigation data by utilizing measurement data from a sensor and topographic data stored in a data structure, and before forming the indication signal, transforming the navigation data in conformity with a position of the image pick-up unit with respect to the environment.

3. A method as claimed in claim 2, wherein the transforming of the navigation data is by way of a perspective transformation.

4. A method as claimed in claim 1, wherein said superimposing said indication signal on said displayed image is in a manner that said indication signal is distinct from the image of the local vehicle environment.

5. A method as claimed in claim 2, wherein the topographic data stored in said data structure is such that intersecting roads are represented by coordinates of their center lines.

6. A method as claimed in claim 5, wherein the topographical data in said data structure also includes data for determining the locations of oppositely directed sides of said roads and further comprising determining at said upcoming road intersection, an intersection of road sides to determine a position of said indication signal relative to said intersection of road sides.

7. A vehicular navigation display system for displaying navigation data generated by a navigation system in conjunction with an image of a local vehicle environment, comprising: an image pick-up means for generating an image of the local environment, a transformation means for transforming said navigation data in conformity with a position of the image pick-up means with respect to the environment, a video generator means for generating an indication signal from the transformed navigation data for marking a path to be followed with respect to the environment, a combination means for combining the image of the environment and the indication signal so as to form a combined image signal representing said indication signal superimposed on the image of the environment, and a display unit for displaying the combined image signal.

8. A vehicular navigation system as claimed in claim 7 further comprising a vehicle in which said navigation system is located.

9. A method of displaying navigational data for a steerable vehicle in conjunction with an image of a local vehicle environment, comprising: generating an image of the local environment from a point of view of an image pick-up unit carried by the vehicle, transforming said navigation data in conformity with a position of the image pick-up unit with respect to the environment, generating an indication signal from the transformed navigation data for marking a path to be followed with respect to the environment, combining the image of the environment and the indication signal so as to form a combined image signal representing said indication signal superimposed on the image of the environment, and displaying the combined image signal on a display unit.

* * * * *